US011127046B1

(12) United States Patent
Schoen et al.

(10) Patent No.: US 11,127,046 B1
(45) Date of Patent: *Sep. 21, 2021

(54) TOOL FOR THIRD-PARTY CREATION OF ADVERTISEMENTS FOR A SOCIAL NETWORKING SYSTEM

(71) Applicant: Facebook, Inc., Menlo Park, CA (US)

(72) Inventors: Kent Schoen, San Francisco, CA (US); Mihir Kedia, Andover, MA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,925

(22) Filed: Sep. 13, 2018

Related U.S. Application Data

(63) Continuation of application No. 12/968,667, filed on Dec. 15, 2010, now Pat. No. 10,083,461.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0269* (2013.01); *G06Q 30/0276* (2013.01); *G06Q 50/01* (2013.01)

(58) Field of Classification Search
None
See application file for complete search history.

(56) References Cited

U.S. PATENT DOCUMENTS

| | | |
|---|---|---|
| 2001/0042010 A1 | 11/2001 | Hassell |
| 2003/0149622 A1 | 8/2003 | Singh et al. |
| 2005/0096979 A1* | 5/2005 | Koningstein .......... G06Q 10/10 705/14.68 |
| 2008/0189169 A1* | 8/2008 | Turpin .................. G06Q 30/02 705/7.33 |
| 2009/0119167 A1* | 5/2009 | Kendall ............. G06Q 30/0255 705/14.17 |

(Continued)

OTHER PUBLICATIONS

Free Ad Templates, Free Ad Templates, https://www.smiletemplates.com/free/ad-templates/0.html, Dec. 2, 2008 (Year: 2008 ).*

(Continued)

*Primary Examiner* — Michael W Schmucker
(74) *Attorney, Agent, or Firm* — Fenwick & West LLP

(57) ABSTRACT

A third-party advertisement creator builds a template for an advertisement using a markup language provided by the social networking system. The template may include a function to call information from a user's profile as well as a function to perform an action in the social networking system and/or external to the social networking system. An advertiser selects a template, add content to the template to create an advertisement, and then requests that the advertisement be published by the social networking system to a viewing user. At runtime, the social networking system parses the markup language in the advertisement to use tags with the viewing user's personal and social information and/or function calls to perform the action (e.g., to make the user a "fan" of a page). This allows personalization of interactive advertisements generated by a third party while protecting the user's personal information maintained by the social networking system.

13 Claims, 6 Drawing Sheets

(56) References Cited

U.S. PATENT DOCUMENTS

| | | | |
|---|---|---|---|
| 2009/0239514 A1 | 9/2009 | Kenagy et al. | |
| 2009/0319359 A1 | 12/2009 | Soza et al. | |
| 2010/0010866 A1 | 1/2010 | Bal et al. | |
| 2011/0276371 A1 | 11/2011 | Norcross et al. | |
| 2012/0150650 A1* | 6/2012 | Zahand | G06Q 30/0251 705/14.58 |

OTHER PUBLICATIONS

United States Office Action, U.S. Appl. No. 12/968,667, dated Apr. 29, 2016, 30 pages.
United States Office Action, U.S. Appl. No. 12/968,667, dated Aug. 17, 2015, 29 pages.
United States Office Action, U.S. Appl. No. 12/968,667, dated Dec. 18, 2014, 33 pages.
United States Office Action, U.S. Appl. No. 12/968,667, dated Feb. 1, 2013, 25 pages.
United States Office Action, U.S. Appl. No. 12/968,667, dated Oct. 18, 2017, 28 pages.
United States Office Action, U.S. Appl. No. 12/968,667, dated Sep. 10, 2013, 25 pages.

* cited by examiner

TOOL FOR THIRD-PARTY CREATION OF ADVERTISEMENTS FOR A SOCIAL NETWORKING SYSTEM

BACKGROUND

This invention relates generally to social networking, and in particular to the creation of advertisements for users of a social networking system.

In a traditional advertising model, advertising companies that advertise to consumers maintain a large inventory of advertisements intended for a variety of demographics. For this reason, advertising companies attempt to simplify the process of creating advertisements so that, ultimately, more advertising can be sold. With the advent of social networking systems, advertisers have increasingly relied on the social networking system to create advertisements within the social networking system because these advertisements interacted directly with objects and user profile information on the social networking system. However, limited advertisement inventories may create a bottleneck in generating advertisements in the social networking system on a large scale.

Interactive advertisements represent a large potential source of revenue because they greatly increase engagement among users of a social networking system. As engagement increases, users of a social networking system share more information, such as their interest in a certain rock band or plans to see an upcoming movie at a local theater. Interactive advertisements enable users to share their favorite rock bands and movies with their connections on the social networking system. This, in turn, creates viral advertising within the social networking system, engaging additional users with the interactive advertisement. As a result, the potential revenue stream from interactive advertisements on social networking systems is potentially large, and it may be increased by increasing the number of interactive advertisements available in inventory for monetization.

Third parties may help solve the bottleneck problem of creating advertisements on a social networking system. However, serious security and privacy issues must also be addressed due to the personalized data potentially available to these third parties on the social networking system. Social networking systems collect large amounts of personal information about their users, such as age, gender, physical location, as well as family pictures, videos, and email addresses. Tools have not been developed to enable third parties to create interactive advertisements on a social networking system while maintaining the security and privacy of its users.

SUMMARY

Embodiments of the invention provide a tool that enables third parties to create advertisements that can be selected and customized by advertisers and then published by a social networking system to users of the system. The advertisements may be interactive, allowing a viewing user to take an action from within the advertisements. The action then causes an effect within the social networking system and/or external to the social networking system.

In one embodiment, a third-party advertisement creator builds a template for an advertisement using a markup language provided by the social networking system. The template includes some basic content and formatting, a function to retrieve information from a user's profile, and a function enabling a viewing user to perform an action (e.g., in the social networking system). The social networking system may obtain a large inventory of these advertisement templates. An advertiser may then select a template from the inventory, add content to the template to create an advertisement, and request that the advertisement be published by the social networking system to one or more viewing users.

At runtime, when a viewing user is to be served the advertisement, the social networking system parses the markup language in the advertisement to use tags to include the viewing user's personal and social information and/or function calls to perform the action (e.g., to make the user a "fan" of a page). This advertisement, now personalized for the viewing user, is sent to a device of the viewing user for display to the viewing user. Accordingly, embodiments of the invention allow personalization of interactive advertisements generated by a third party while protecting the user's personal information that is maintained by the social networking system.

Figure 1:
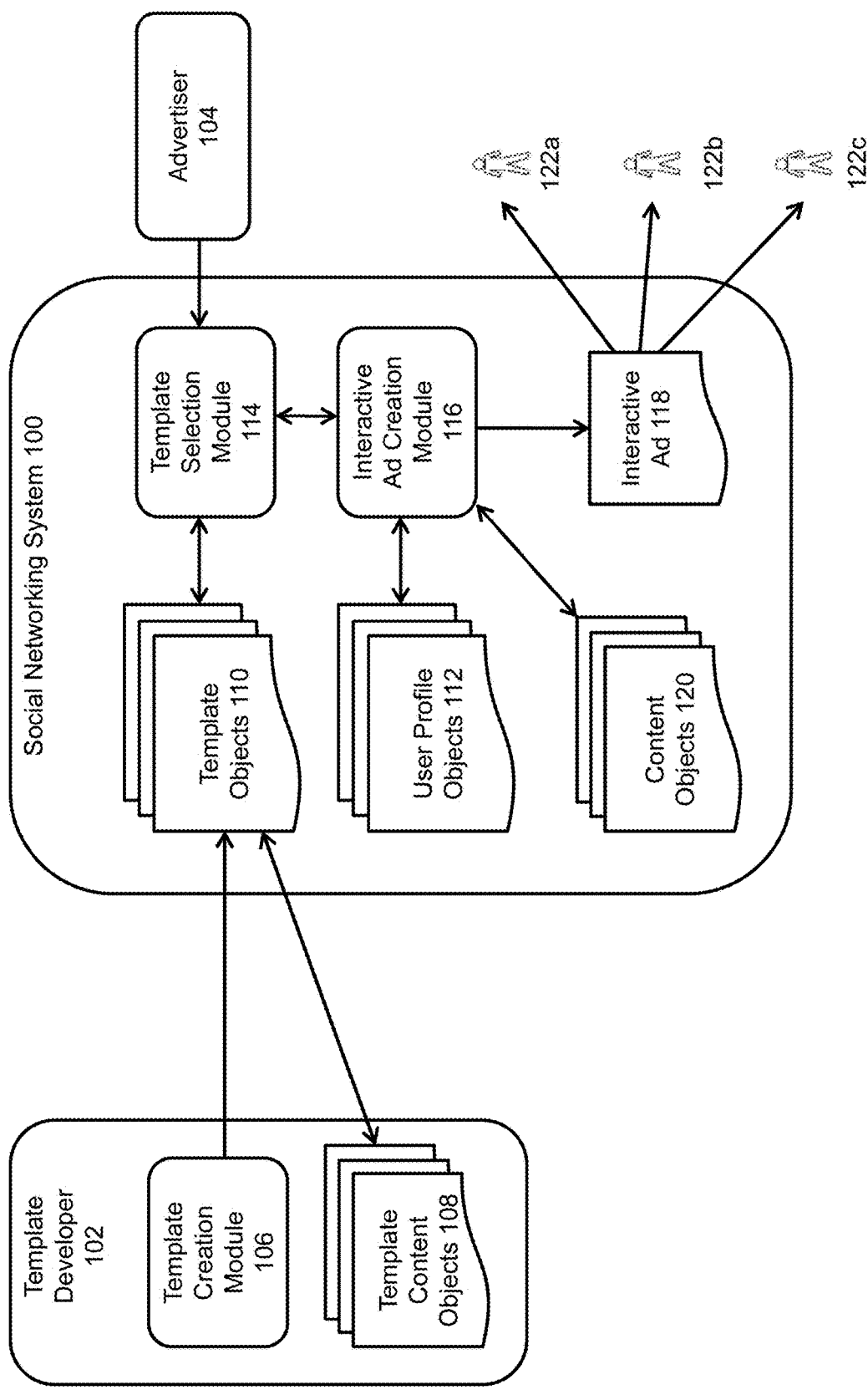
FIG. 1 is a high-level block diagram illustrating the creation of template objects by a developer for use by an advertiser, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of social networking system can provide information describing them which is stored as user profiles. For example, a user can provide age, gender, geographical location, education history, employment history and the like describing them. The information provided by users may be used by the social networking system to direct information to the user. For example, the social networking system may recommend social groups, events, and potential friends to a user. The social networking system may also use the information describing a user to direct advertisements to the user, ensuring that only relevant advertisements are directed to the user. Relevant advertisements ensure that advertising spending reaches their intended audiences, rather than wasting shrinking resources on users that are likely to ignore the advertisement.

Interactive advertisements take advantage of the numerous actions that can be performed within a social network, allowing advertisers to maximize brand impressions while engaging users without disrupting the social networking experience. This mode of advertising is more effective than traditional banner ads because users are more likely to pay attention to an advertisement that mimics the social networking experience. For example, a social networking system may allow a user to comment on a story that was posted by one of his friends. The comment would modify the story object so that other users would be able to see the user's comment if connected to the user. An interactive advertisement mimics this functionality by enabling the user to comment on the interactive advertisement itself. Instead of taking the user away from the social networking website, like traditional banner ads, users may perform actions within the social network when engaging with interactive advertisements. Additionally, the comment would modify the interactive advertisement so that connections would be able to see the user's comment. Thus, advertisers can maximize the benefit of a user's expected experience with the social networking system beyond simple demographic targeting that merely chases product demand.

Templates can be used within a social networking system for third parties to host and develop interactive advertisements. Because privacy and security of data within the social networking system are critical issues to the continued growth of a social networking system, templates are developed using a markup language that provides access to profile information about a user, such as their last known physical location and movie preferences, without risking the security of the profile information. For example, the markup language may utilize signifiers that, when interpreted by the social networking system, may enable the third party developer to retrieve a user's profile information using tags in the markup language. In this way, interactive advertisements may be created by third parties for use within the social networking system without compromising the security and integrity of individual users' profile information and other data.

Additionally, a more relevant advertisement that informs the user of a movie showing at nearby theaters can be served to a user with the additional functionality of querying a third party developer's database of real-time listings. Because the interactive advertisement is generated from a third-party-developed template object, the template object may retrieve data from private resources, such as a real-time movie listings database. Other functionalities, such as purchasing movie tickets from within the interactive advertisement on the social networking system, can be integrated by the third-party developer into the template object. By opening up development of template objects to trusted third-party developers, the social networking system's user experience of interactive advertising is greatly increased because the interactive advertisements can be generated on a larger scale, a variety of template objects can be developed, and the resources of the developers extends the capability of the social networking system's resources.

FIG. 1 is a diagram of the creation of template objects and the use of template objects to generate interactive advertisements in a social networking system, in accordance with an embodiment of the invention. The users 122a, 122b, and 122c interact with advertisements on the social networking system 100. (A letter after a reference numeral, such as "122a," indicates that the text refers specifically to the element having that particular reference numeral, while a reference numeral in the text without a following letter, such as "122," refers to any or all of the elements in the figures bearing that reference numeral.)

The social networking system 100 stores various objects comprising information related to users, connections between users, or other entities represented in the social networking system 100. These objects include template objects 110 that are created by a third-party template developer 102, user profile objects 112 that store information describing the users of the social networking system 100, and content objects 120 that enable actions, such as adding an event to a user's calendar, to be performed on the social networking system 100. Users of the social networking system 100 may take actions using the social networking system 100 that are associated with one or more content objects 112.

A template developer 102 includes third party developer systems that host and create interactive advertisements. A template creation module 106 utilizes markup language provided by a social networking system 100 to create template objects 110 that comprise one or more functions that perform an action within the social networking system 100 in connection with a user's account. The template developer 102 also includes template content objects 108 that are used by the template objects 110 to enable actions to be performed on interactive advertisements generated from the template object 110 that access data on the template developer 102. For example, a particular template content object 108 may enable a real-time search that provides show times of a particular movie being advertised in an interactive advertisement on the social networking system 100. In this way, the template object 110 utilizes the functionality of the template content object 108 to create an interactive advertisement on the social networking system 100.

The social networking system 100 includes a template selection module 114 that enables an advertiser 104 to select a template object 110. The template selection module 114 also includes functionality to receive content from an advertiser 104 for inclusion in the selected template object 110 as well as receiving targeting criteria. Once the template selection module 114 receives a selection of a template, an interactive ad creation module 116 creates an interactive ad 118 based on the selected template and the provided content from the advertiser. The advertiser 104 provides targeting criteria to ensure that users 122 of the social networking system 100 are served with the generated interactive ad 118.

Returning to the previous example, a template developer 102 might have created a template object 110 that encourages users of a social networking system 100 to go watch a movie at a nearby theater. The advertiser 104, in this example, would select content for the template object 110, such as a movie trailer. The advertiser 104 might also configure the template object 110 by selecting options to utilize users' profile information, stored in user profile objects 112, such as pre-populating a text field with the user's home zip code within the interactive ad that requests a zip code in order to show movie listings. In this way, the user's private information is protected while also enabling a highly desirable feature in an interactive advertisement 118 from within a social networking system 100.

Continuing the hypothetical, an advertiser 104 might also configure the selected template object 110 to add an event to the user profile object 112 when a user decides to purchase movie tickets for a particular showing. Depending on the user's privacy settings, a story could be shared with the user's connections in the social networking system 100, informing them that the user will be attending the 9:00 PM showing of "The Sound of Music" at the Castro Theater, for example. This event would be added to the user's profile information object 112 and shared with the user's connections on the social networking system 100.

Additionally, the template developer 102 may have also designed the selected template object 110 to enable users to "tag" the users' connections in an event. The interactive advertisement may allow the user to select a number of connections that will also be attending the 9:00 PM showing of "The Sound of Music" at the Castro Theater, thus enabling the interactive advertisement 118 to perform actions on the users' connections' user profile objects 112 as well. The selected template object 110 might also be configured by the advertiser 104 to target the connections of a user who interacted with the advertisement. In this way, the interactive advertisement 118 can easily be virally distributed throughout the social networking system 100.

As illustrated by this example, a template developer 102 may create a template object 110 that may perform a multitude of actions within a social networking system 100. The personal information of users of the social networking system 100 is protected because the template developer 102 is provided with a markup language that is processed by the social networking system 100. As a result, user privacy is maintained while utilizing the resources and development capability of third party developers to generate more interactive advertisements.

System Architecture

Figure 2:
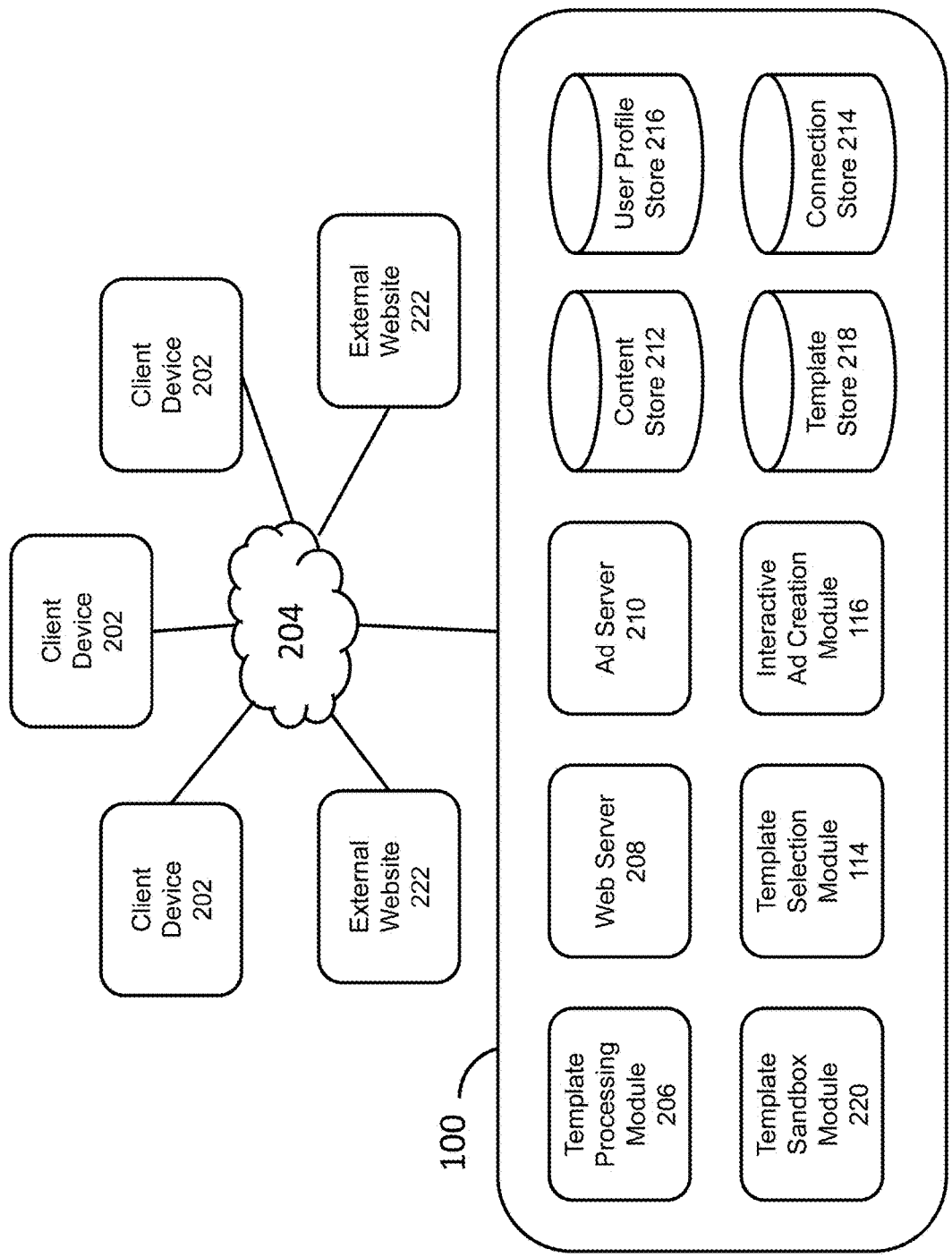
FIG. 2 is a network diagram of a system for providing advertisements to users of a social networking system, showing a block diagram of the social networking system, in accordance with an embodiment of the invention.

FIG. 2 is a high level block diagram illustrating a system environment suitable for inferring information describing users based on social networking information, in accordance with an embodiment of the invention. The system environment comprises one or more client devices 202, the social networking system 100, and a network 204. In alternative configurations, different and/or additional modules can be included in the system.

The client devices 202 comprise one or more computing devices that can receive user input and can transmit and receive data via the network 204. In one embodiment, the client device 202 is a conventional computer system executing, for example, a Microsoft Windows-compatible operating system (OS), Apple OS X, and/or a Linux distribution. In another embodiment, the client device 202 can be a device having computer functionality, such as a personal digital assistant (PDA), mobile telephone, smart-phone, etc. The client device 202 is configured to communicate via network 204. The client device 202 can execute an application, for example, a browser application that allows a user of the client device 202 to interact with the social networking system 100. In another embodiment, the client device 202 interacts with the social networking system 100 through an application programming interface (API) that runs on the native operating system of the client device 202, such as iOS 4 and DROID.

In one embodiment, the network 204 uses standard communications technologies and/or protocols. Thus, the network 204 can include links using technologies such as Ethernet, 802.11, worldwide interoperability for microwave access (WiMAX), 3G, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 is a block diagram of an embodiment of the social networking system 100. The social networking system 100 includes a web server 208, an ad server 210, a content store 212, a user profile store 216, a connection store 214, a template store 218, a template processing module 206, a template sandbox module 220, a template selection module 114, and an interactive ad creation module 116. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more client devices 202; the web server 208 serves web pages, as well as other web-related content, such as Java, Flash, XML, and so forth. The web server 208 may provide the functionality of receiving and routing messages between the social networking system 100 and the client devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native client device operating systems, such as iOS, DROID, webOS, and RIM.

An ad server 210 serves advertisements within the social networking system 100 to client devices 202. For example, a web page being viewed on a web browser on a client device 202 would have advertisements served by the ad server 210 in certain regions of the web page, like traditional banner advertisements, or as part of the social networking experience as a story, a post in the stream, a fan page for a particular brand, or social gaming applications that operate within the social networking system 100. An ad server 210 may also serve interactive advertisements via the network 204 to external websites 222. These external websites 222 may embed interactive advertisements in inline frames (iFrame). The ad server 210 may also serve interactive advertisements in third-party applications on client devices 202. In one embodiment, an ad server 210 may serve advertisements to a native platform's operating system, such as iOS and DROID, to appear as advertisements in native applications.

Interactive advertisements may be created by advertisers using an application that provides selectable templates using the template selection module 114 from the template store 218. The interactive advertisements are then stored as objects in the content store 212 to be later served to client devices 202 by the ad server 210. Advertisers may select which actions a member may perform from within the interactive advertisement using the application. After selecting the actions that can be performed on the social networking system, the interactive advertisement is associated with the appropriate objects by the interactive ad creation module 116 within the social networking system 100 in order for the selection of the link to perform the action within the interactive advertisement to modify the correct object. A content store 212 maintains these objects in the social networking system 100. A user of the social networking system 100 can interact with and perform actions on a variety of objects, such as groups, events, pages, applications, and the like. Various actions can be performed within the interactive advertisements, as described in U.S. application Ser. No. 12/390,362, filed Feb. 20, 2009, the contents of which are fully incorporated by reference.

A user profile store 216 maintains profile information about users of the social networking system 100, such as age, gender, interests, geographic location, email addresses, credit card information, and other personalized information. The user profile store 216 also maintains information about objects in the content store 212 that the users performed actions on. A connection store 214 maintains the connections of the users of the social networking system 100. The connection store 214 acts as a cross-referencing database for the user profile store 216 and the content store 212 to determine which objects are also being modified by connections of a user.

A template store 218 maintains template objects that have been developed to generate interactive advertisement objects. A template processing module 206 includes a process that parses markup language in the third-party-developed template objects and replaces third-party-developed source code with tags that can be interpreted by the social networking system 100.

A template selection module 114 includes a process that enables an advertiser to select template objects. The template selection module 114 enables the advertiser to select a template object via an application on the social networking system 100. The template selection module 114 also includes a process that enables an advertiser to configure template objects with information needed to generate an interactive advertisement object. This configuration may also be performed through the application on the social networking system 100 or manually by the advertiser by modifying the selected template content object source code.

An interactive ad creation module 116 includes a process to receive selections from an advertiser via the template selection module 114 to generate an interactive advertisement object. The interactive ad creation module 116 combines the information gathered from the advertiser, including content and targeting criteria, and generates an interactive advertisement object from the selected template object to advertise to users in the social networking system 100. A template sandbox module 220 includes a process that provides sample data to developers to test template objects in an environment similar to the social networking system 100.

Generating Interactive Advertisements from Template Objects

Figure 3:
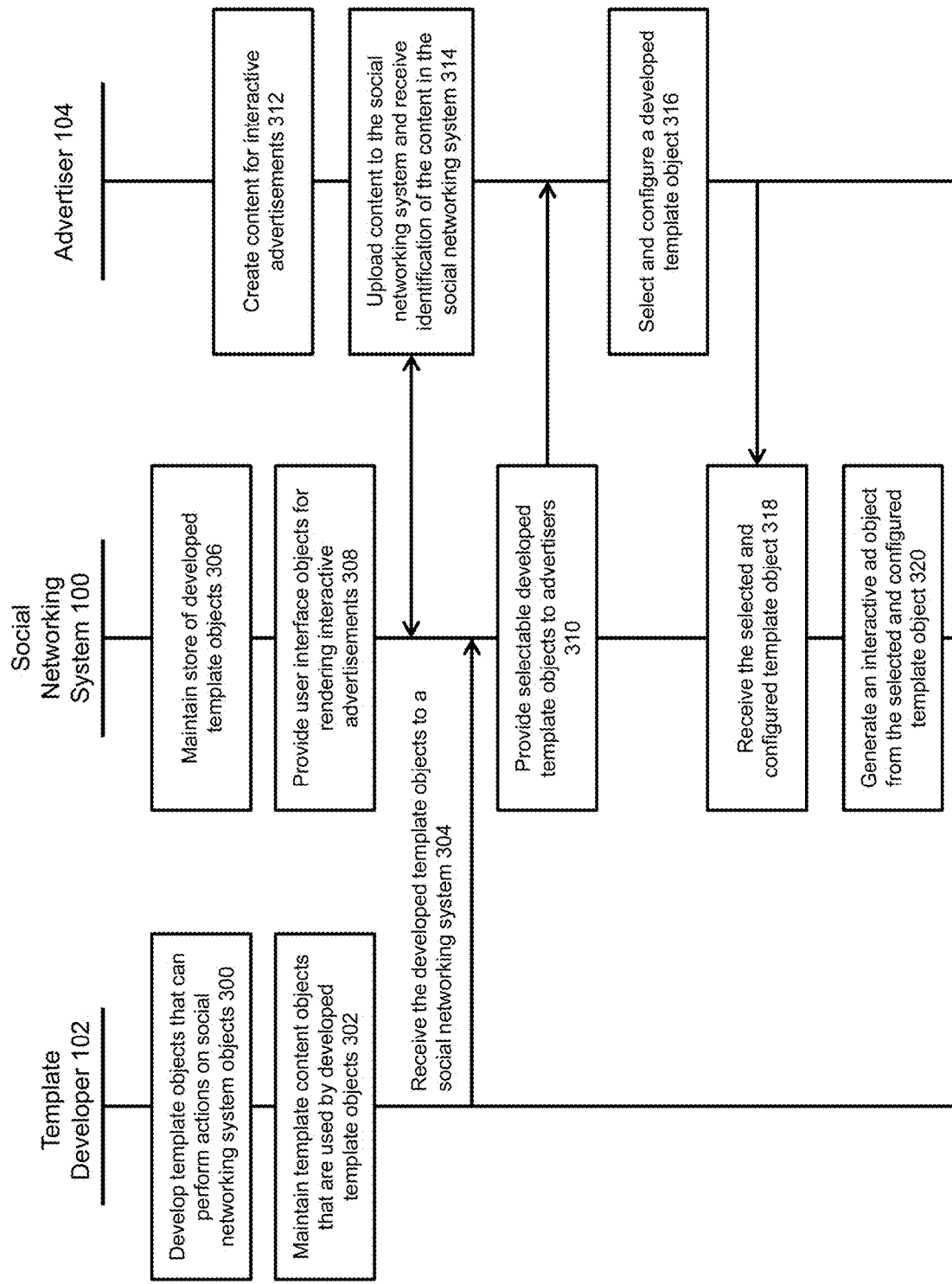
FIG. 3 is an interaction diagram of a process for developing template objects to create interactive advertisements within a social networking system, in accordance with an embodiment of the invention.

FIG. 3 illustrates a process showing how template objects are developed to create interactive advertisements within a social networking system, in accordance with an embodiment of the invention. As illustrated, the steps involved in developing template objects for creating interactive advertisements on the social networking system 100 may occur asynchronously.

The template developer 102 may develop 300 a template object that performs an action on one or more objects in the social networking system. This development step 300 includes drafting source code in a markup language that can be interpreted by the social networking system 100. Example templates include an RSVP for an event, displaying an audio or video object and allowing users to "like" the brand page, and performing a real-time query on a developer's database and delivering results within the interactive advertisement. Each of these templates may be selected by advertisers to promote a variety of products and services. By enabling third-party developers to create these template objects, advertisers will have more variety and resources to generate more engaging interactive advertisements on the social networking system, thus generating more revenue and ad spending.

A template developer 102 also maintains 302 template content objects that are used by the template objects. For example, a real-time query requires a database to be maintained and queried. In this instance, the database being queried is a template content object that is maintained 302 by the template developer 102. In another example, a template developer 102 may be a casual games developer that creates virtual worlds with virtual currency and transaction databases. In that case, the template content objects being maintained 302 include all of the game-related data, such as the virtual currency and transaction data. The template developer 102 may develop a template object that relies on these template content objects to provide more engaging interactive advertisements.

Eventually, the social networking system 100 receives 304 template objects from the template developer 102. The social networking system 100 maintains 306 a store of template objects. In this way, each template object is identifiable and retrievable from the template store 218. The social networking system 100 also provides 308 user interface objects for rendering interactive advertisements on client devices.

Selectable template objects are then provided 310 to advertisers. Advertisers may access the template object via an application on the social networking system 100 or, if permitted, by manually accessing the template object source code. An advertiser 104 may create 312 content for interactive advertisements, such as audio or video clips, content objects on the social networking system such as pages, events, groups, and other advertising content. The advertiser 104 may upload 314 this content to the social networking system as objects in the content store 212 to identify and retrieve the content for use in configuring template objects.

An advertiser 104 may select and configure 316 a template object from the template store 218. An advertiser 104 may select a template to generate an interactive advertisement via an application on the social networking system 100 or by manually completing the template object source code. The advertiser 104 may configure a selected template object by setting audience targeting parameters and linking the interactive advertisement to uploaded content, such as a video clip or event object. The advertiser 104 also may configure the selected template object via an application on the social networking system 100 or by manually completing the template object source code.

After receiving 318 the selected and configured template object, the social networking system 100 generates 320 an interactive advertisement object from the selected and configured template object. The generated interactive advertisement object is then stored in the content store 212 and is ready to be served by the ad server 210.

Figure 4:
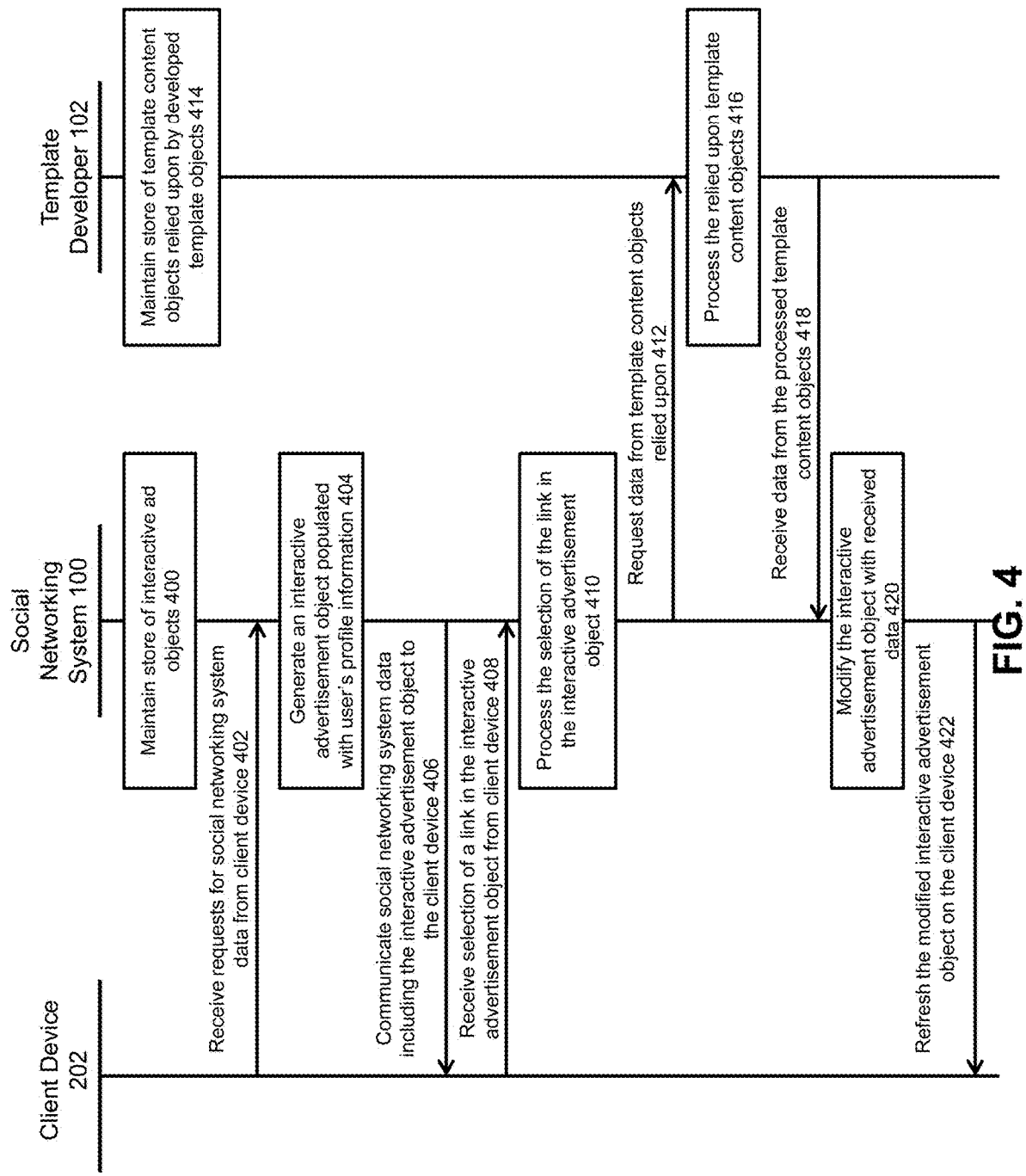
FIG. 4 is an interaction diagram of a process in which an interactive advertisement generated from a template object is used by a client device, in accordance with an embodiment of the invention.

Performing Actions within Interactive Advertisements Generated from Template Objects FIG. 4 illustrates how a client device displays and engages with an interactive advertisement generated from a template object and how actions performed in the interactive advertisement are reflected in the social networking system and template developer, in accordance with an embodiment of the invention. The social networking system 100 maintains 400 a store of interactive advertisement objects. In one embodiment, the social networking system 100 maintains 400 interactive advertisement objects in the content store 212.

The social networking system 100 receives 402 requests for data from a client device 202. This data includes website requests, API requests, and other data that is interpreted by the client device 202 to display information about the social networking system 100 to the user. Based on the client device 202, the social networking system 100 may generate 404 an interactive advertisement that is populated with the user's profile information. Because a user must be authenticated via the client device 202, the interactive advertisement object has access to the user's profile information, a user profile object, on the social networking system 100.

The social networking system 100 communicates 406 the requested data, including the interactive advertisement object, to the client device 202. In one embodiment, the client device 202 has a web browser receiving this communicated data to display a webpage rendering the interactive advertisement. In another embodiment, the client device 202 is running a native application programming interface (API) to communicate with the social networking service 100 and render the communicated data in a native application. The social networking system 100 next receives 408 a selection of a link in the interactive advertisement object from the client device 202. The link in the interactive advertisement object may be configured to perform an action within the social networking system or perform an action on a template developer. The selection of the link in the interactive advertisement is processed 410 by the social networking system 100. In one embodiment, the selection of the link may perform an action in the social networking system 100, such as responding to an RSVP for an event object or adding a fan page to a user's profile information by "liking" the fan page.

In another embodiment, the selection of the link may perform an action in the template developer 102, such as requesting 412 template content objects relied upon by the interactive advertisement object. As mentioned above, a template developer 102 may maintain 414 a store of template content objects relied upon by template objects. For example, a template developer may host a virtual world gaming application that trades virtual currency for particular tasks that a user must complete in the game.

The template developer 102, in response to the request from the social networking system 100, would process 416 the template content objects pursuant to the request. An interactive advertisement for the virtual world gaming application may have solicited the user to click a button to give a connected user some free virtual money. As a result of the click, or selection of the link, the social networking system 100 would issue a request that the connected user's account on the template developer 102 database be incremented by a stated amount in the interactive advertisement. The processing step 416 may further include other actions, such as signing up the user with the gaming application and creating an account, within the template developer 102 and modify template content objects.

After the processing step 416, the social networking system 100 receives 418 data from the processed template content objects. In the above example, this data includes a confirmation that the transaction on the connected user's account was successful as well as confirmation of account creation and/or a request to start the gaming application. The social networking system 100 modifies 420 the interactive advertisement object with this received data. In addition, other objects that are affected by the received data, such as adding the application to the user's list of approved applications in the user's profile information, may be modified in this modification step 420. The social networking system 100 then refreshes 422 the modified interactive advertisement object as rendered on the client device 202. Thus, the client device 202 will display the modified interactive advertisement with, for example, a confirmation that the transaction was successful in giving free currency to the user's connected user.

Figure 5A:
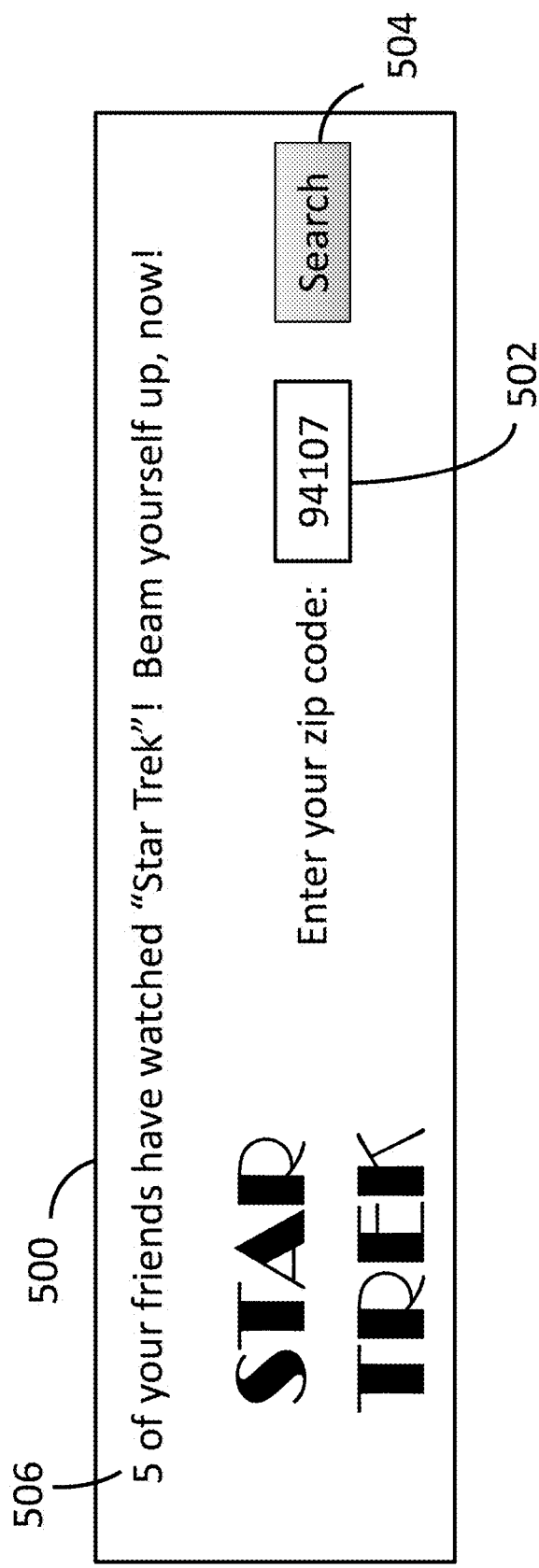
FIGS. 5A and 5B illustrate an example of an interactive advertisement generated from a template object within a social networking system and the modified interactive advertisement after a user selects a link, in accordance with an embodiment of the invention.
Figure 5B:
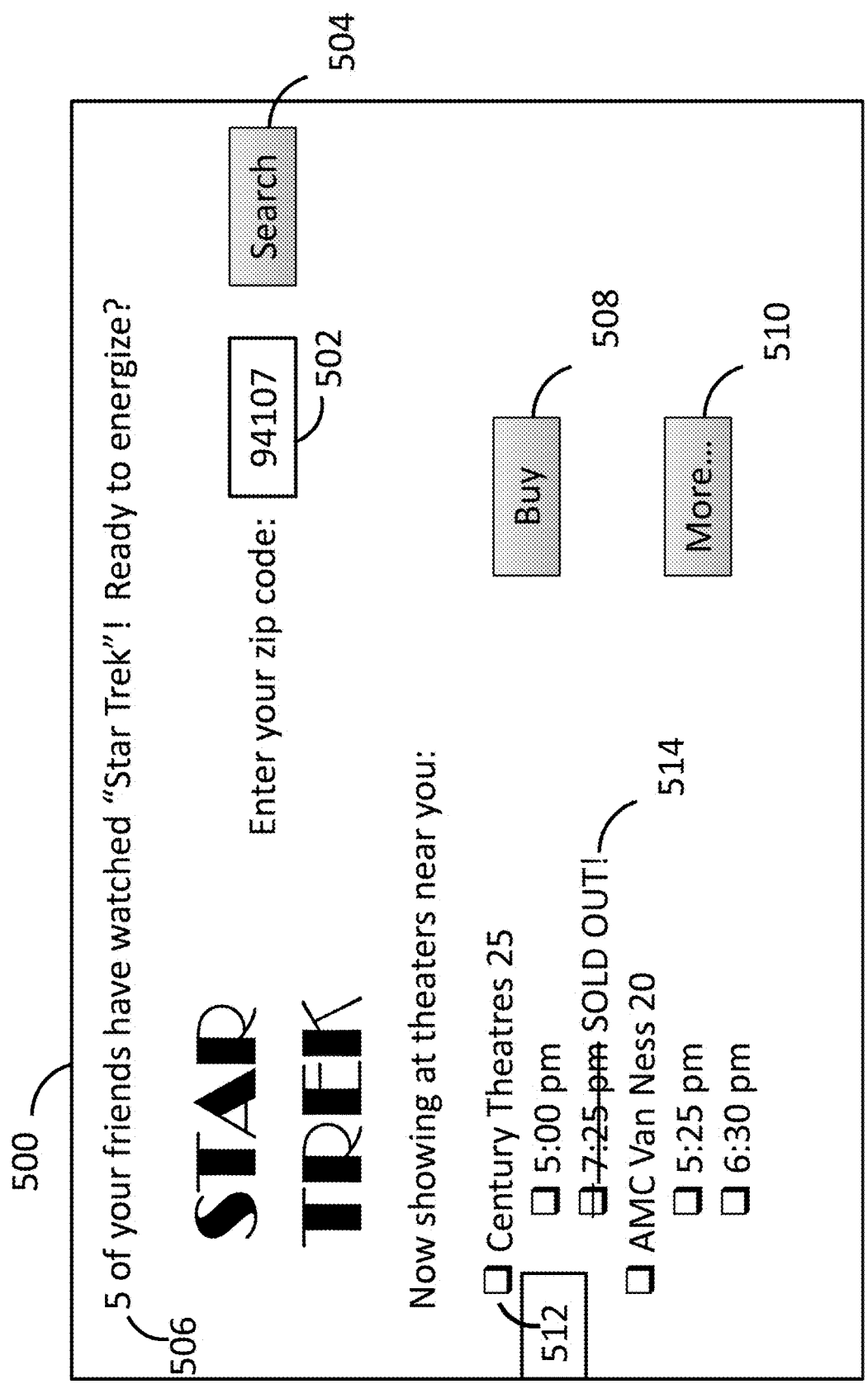

FIGS. 5A and 5B are examples of an advertisement template within a social networking system and the modified interactive advertisement after a user selects a link, in accordance with an embodiment of the invention. The illustrated interactive advertisement 500 in FIG. 5A notifies the user that five of the user's connections have watched the movie being advertised in the call to action 506. Thus, the interactive advertisement object was generated from a template object that accessed the user's connections in a connections object for the user and cross-referenced those connections with the users who have seen the movie being advertised, stored as a content object in the content store 212.

Interactive advertisements such as these can be generated in batches and targeted towards specific types of users based on their profile information. One type of targeting criteria might include users that have a high number of connections that are connected to an object representing the product being advertised. As a result, advertising inventory can be queued for these targeted users, providing advertisers with users that are highly likely to be interested in the product.

In FIG. 5A, the call to action 506 requests the user to "Beam yourself, now!" The interactive advertisement 500 includes a text box 502 that has been populated with the user's home zip code and a selectable link 504 to execute a search query. The user's home zip code was accessed in the user's profile information.

FIG. 5B illustrates the modified interactive advertisement 500 after the client device selects the link 504. The interactive advertisement 500 expands to include selectable listings 512 of show times for the movie at nearby theaters, a link to purchase tickets 508 for a selected listing, and a link to show more listings 510. In one embodiment, the user may click on a desired show time 512 and then click the link to purchase tickets 508. The selection of the link to purchase tickets 508 may pop up with another screen to select the quantity and payment method of the transaction, or the selection of the link may switch the client device to a web browser to a web page where the transaction can be completed. Additionally, the interactive advertisement 500 also displays real-time data 514, informing the user of a show time listing that is sold out at a nearby theater. The template developer 202 hosts the template content objects, real-time databases of movie ticket inventory, that enable this functionality.

In some embodiments, interactive advertisements appear on a webpage displaying social networking system data, an API that operates on a native mobile platform, embedded in an iFrame tag in HTML/XHTML on a third party website, or third party API external to the social networking system. In another embodiment, interactive advertisements may also exist as SMS campaigns where users text a message to a short code number that initiates an action within a social networking system. In yet another embodiment, interactive advertisements may appear within other applications, such as a virtual world gaming application in which the interactive advertisement appears as part of the application.

Many different types of advertisers may wish to utilize these interactive advertisements. Collective bargaining for local deals may rely on interactive advertisements on social networking systems and third party systems to solicit users to purchase products quickly. Other uses of interactive advertisements include political campaigns, fundraising for causes, and digital music distribution.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
storing, at an online system, a template object received from a third-party system external to the online system, the template object for displaying a content item, the template object comprising instructions for a custom content item, wherein the instructions, when executed by a processor of the online system, cause the online system to:
retrieve user profile information;
incorporate the retrieved user profile information into a display of the custom content item also including third-party content; and
request the third-party system perform an action specified by the template object responsive to user interaction with the custom content item;
receiving, from a computing device, a request for one or more content items from the online system, the computing device being associated with a user of the online system;
responsive to receiving the request:
retrieving, by the online system based on the instructions from the template object, user profile information from a user profile of the user to be incorporated into the display of the custom content item using the template object received from the third-party system external to the online system; and
generating, by the online system, the custom content item based on the content instructions from the template object by adding the third-party content and the user profile information of the user to the display of the custom content item; and
transmitting the generated custom content item to the computing device for display;
responsive to an interaction by the user with the generated custom content item, sending to the third-party system a request to perform the action specified by the template object, the interaction by the user is a selection of the generated custom content item;
responsive to the third-party system performing the action specified by the template object, modifying the generated custom content item based on performing the action specified by the template object by:
receiving, from the third-party system external to the online system, a confirmation that the action has been performed, the confirmation including information associated with the action performed by the third-party system external to the online system; and
responsive to receiving the confirmation, modifying the generated custom content item based on the information associated with the action; and
transmitting the modified custom content item to the computing device for display.

2. The method of claim 1, wherein transmitting the generated custom content item to the computing device for display further comprises:
establishing communication with the computing device via a web server; and
providing data comprising the generated custom content item to the computing device for display.

3. The method of claim 1, wherein transmitting the generated custom content item to the computing device for display further comprises:
embedding an inline frame in a third-party system associated with the user of the online system; and rendering the generated custom content item in the inline frame in the third-party system for display.

4. The method of claim 1, wherein retrieving user profile information from the user profile of the user to be incorporated into the custom content item further comprises:
parsing source code in the template object to identify a signifier that requests information from an account associated with the user of the online system;
adding a tag that retrieves the information from the account associated with the user of the online system upon identifying the signifier; and
processing the source code in the template object comprising the tag to retrieve the user profile information.

5. The method of claim 1, wherein the generated custom content item further comprises an instruction for performing an action within the online system.

6. The method of claim 1, wherein the generated custom content item further comprises an instruction for performing an action outside of the online system.

7. The method of claim 1, wherein the user profile information associated with the user is information describing users connected to the user and one or more actions performed by the users connected to the user on the online system.

8. The method of claim 1, wherein the user profile information associated with the user is information describing real-time data associated with a location of the user.

9. A non-transitory computer readable medium comprising instructions that, when executed by a processor, cause the processor to perform steps comprising:
storing, at an online system, a template object for displaying a content item, the template object received from a third-party system external to the online system, the template object comprising instructions for a custom content item that, when executed by a processor, cause the online system to:
retrieve user profile information;
incorporate the retrieved user profile information into a display of the custom content item also including third-party content; and
request the third-party system perform an action specified by the template object responsive to user interaction with the custom content item;
receiving, from a computing device for an impression opportunity, a request for a custom content item, the computing device being associated with a user of the online system;
responsive to receiving the request:
retrieving, by the online system based on the instructions for the custom content item, user profile information from a first user profile of the user to be incorporated into a display of the custom content item using the template object received from the third party system external to the online system;
generating, by the online system, the custom content item based on the instructions from the template object by adding the third-party content and the user profile information of the user to the display of the custom content item; and
transmitting, by the online system, the generated custom content item to the computing device for display to the user;
responsive to an interaction by the user with the generated custom content item, sending to the third-party system a request to perform the action specified by the template object, the interaction by the user comprising a selection of the generated custom content item;
responsive to the third-party system performing the action specified by the template object, modifying the generated custom content item based on performing the action specified by the template object by:
receiving, from the third-party system external to the online system, a confirmation that the action has been performed, the confirmation including information associated with the action performed by the third-party system external to the online system; and
responsive to receiving the confirmation, modifying the generated custom content item based on the information associated with the action; and
transmitting the modified custom content item to the computing device for display.

10. The non-transitory computer readable medium of claim 9, wherein transmitting, by the online system, the generated custom content item to the computing device for display to the user further comprises:
embedding an inline frame in a second third-party system associated with the user of the online system; and
rendering the generated custom content item in the inline frame in the second third-party system for display.

11. The non-transitory computer readable medium of claim 9, wherein transmitting, by the online system, the generated custom content item to the first computing device for display to the first user further comprises:
embedding an inline frame in a third-party system associated with the first user of the online system; and
rendering the generated custom content item in the inline frame in the third-party system for display.

12. The non-transitory computer readable medium of claim 9, wherein generating the custom content item based on the further comprises combining the third-party content and the user profile information.

13. The non-transitory computer readable medium of claim 9, wherein the generated custom content item further comprises an instruction for performing an action within the online system.

* * * * *